Feb. 19, 1924.
1,484,311
F. V. TISCHER
APPARATUS AND METHOD OF MAKING LAMINATED STRUCTURES
Filed Feb. 28, 1923    3 Sheets-Sheet 2
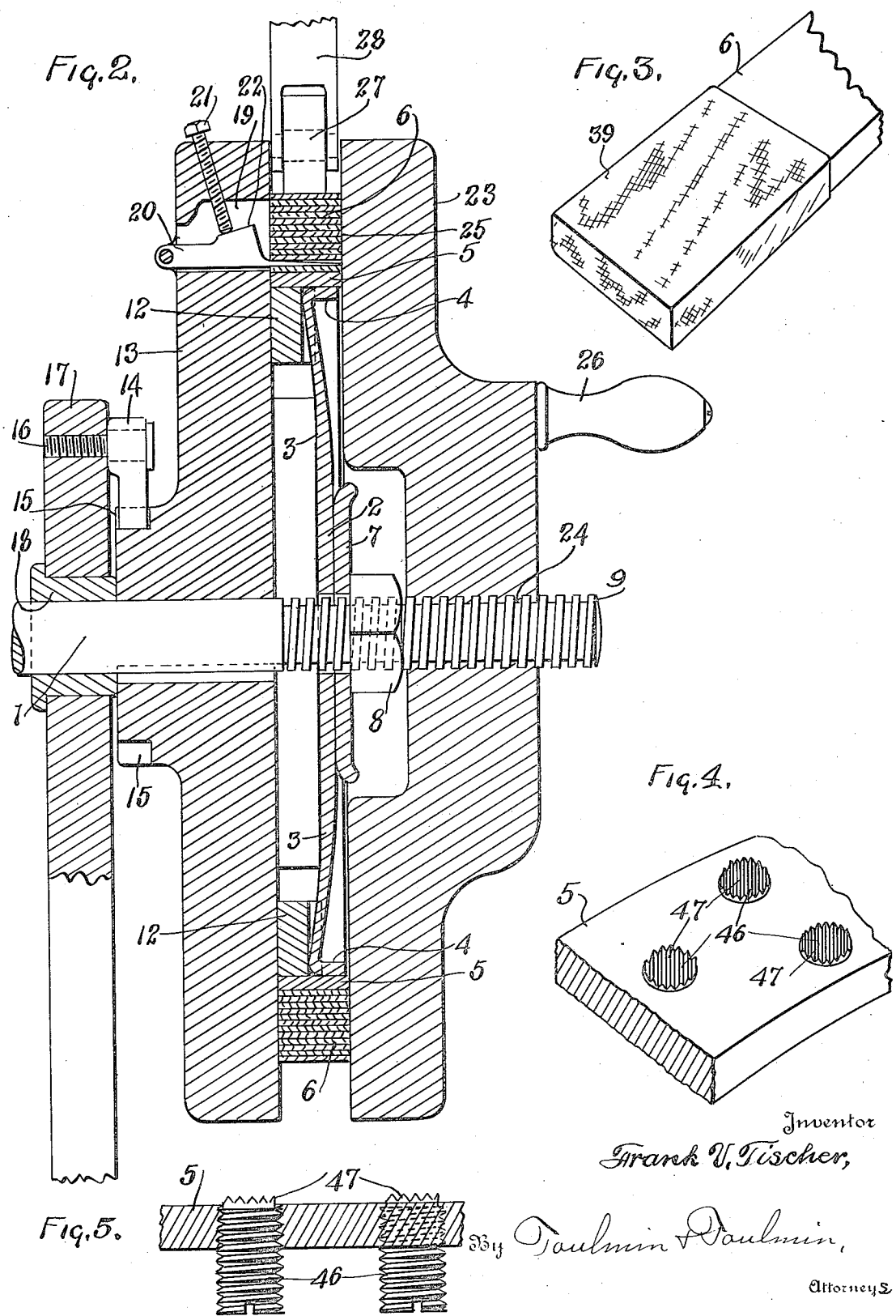

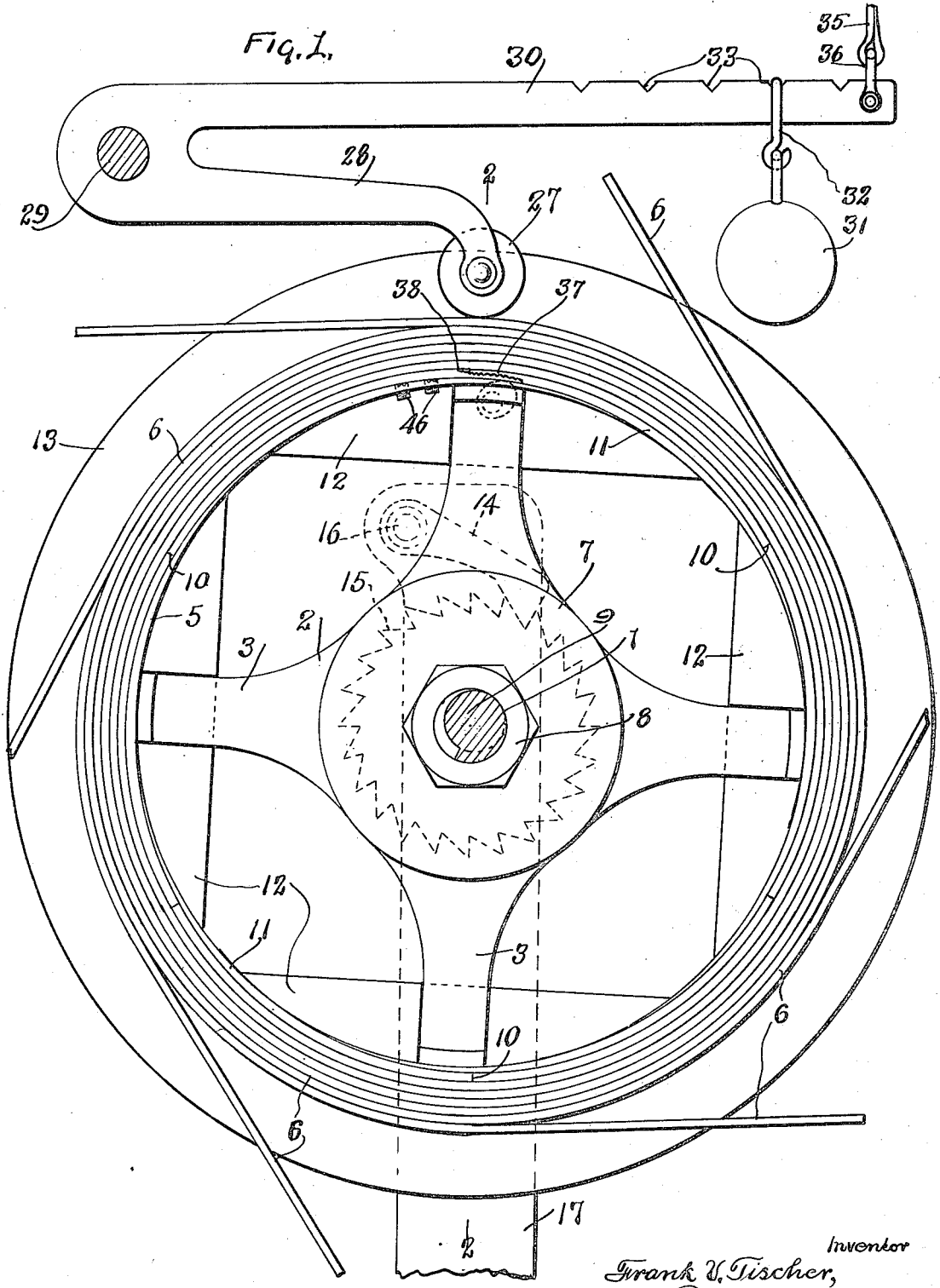

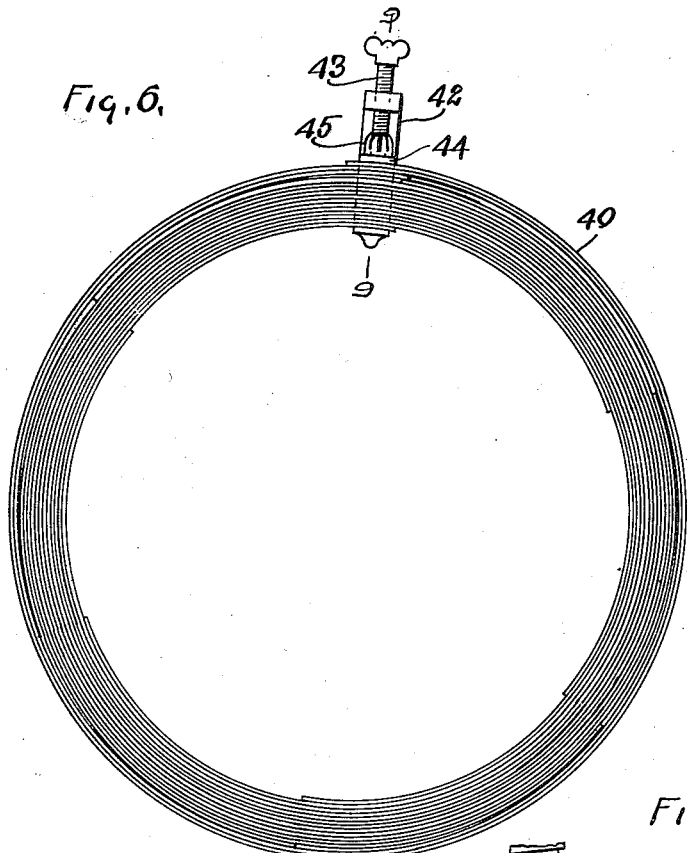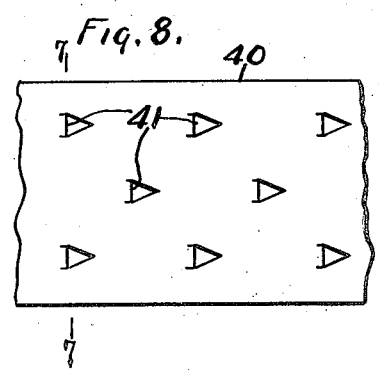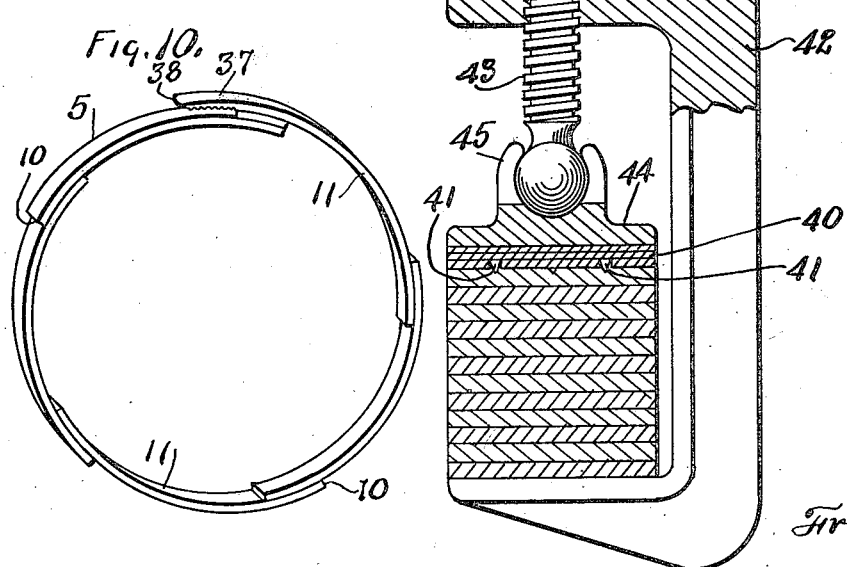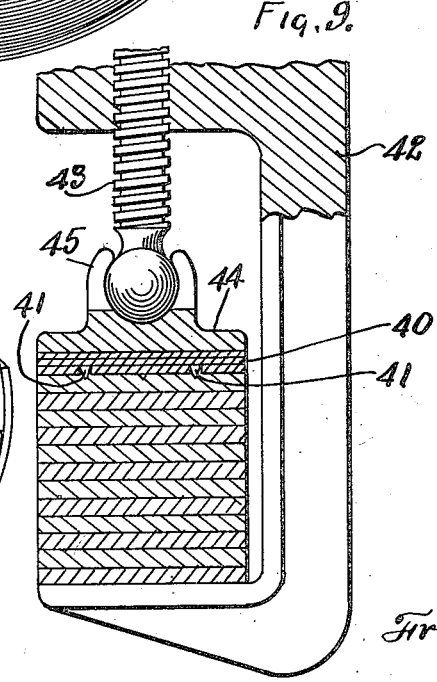

Patented Feb. 19, 1924.

1,484,311

UNITED STATES PATENT OFFICE.

FRANK V. TISCHER, OF DAYTON, OHIO.

APPARATUS AND METHOD OF MAKING LAMINATED STRUCTURES.

Application filed February 28, 1923. Serial No. 621,700.

*To all whom it may concern:*

Be it known that I, FRANK V. TISCHER, a citizen of the United States, residing at Dayton, in the county of Montgomery and State of Ohio, have invented certain new and useful Improvements in Apparatus and Methods of Making Laminated Structures, of which the following is a specification, reference being had therein to the accompanying drawing.

My invention relates to apparatus and method of making laminated structures and the product resulting therefrom.

It is the object of my invention to provide a method and a machine for the manufacture of laminated structures such as steering wheels for automotive equipment and the like.

It is the object of my invention to provide a laminated structure of such a character that the butt joints will not be adjacent to one another, that the laminations will not slip with respect to one another while the structure is being assembled, and it is a further object that the laminations may be held together as indicated after being pressed together and held in such a unitary form until the whole structure has set by the drying of the glue and the like.

It is a further object of my invention to provide mechanism for producing such laminated structures in quantities accurately and of uniform character.

It is a further object of my invention to provide a machine which will align the laminations and apply them to one another under pressure.

It is an additional object of my invention to arrange the laminations when circular structures such as steering wheels are being made on successive volutes, so as to secure a spiral winding of the laminations to give great strength and rigidity to the resulting structure with all joints overlapped.

Referring to the drawings:

Fig. 1 is a side elevation of the complete wrapping machine in the process of wrapping the laminations on a collapsible support and upon the volute ring.

Fig. 2 is a section on the line 2—2 of Fig. 1, which is a slight modification in the method of retaining the laminations upon the drum.

Fig. 3 is an illustration of the fabric covered starting end of the first lamination which is inserted in a serrated jaw on the volute ring.

Fig. 4 is a portion of the volute ring with the upwardly pressing corrugated retaining screws which engage with the bottom of the initial lamination.

Fig. 5 is a section showing such a screw located in the volute ring.

Fig. 6 is a view of the complete structure after having been removed from the volute ring having a drying ring and clamp in position.

Fig. 7 is a section on the line 7—7 of Fig. 8 showing the engaging fingers on the drying ring.

Fig. 8 is a plan view of the drying ring.

Fig. 9 is a section, enlarged, on the line 9—9 of Fig. 6 showing the engaging fingers of the drying ring and the clamp in position.

Fig. 10 is a perspective of the volute ring.

Referring to the drawings in detail:

1 is an axle which supports a spider 2. This spider has spring arms 3 which are turned over at their outer ends as at 4 to provide a broad bearing surface for engagement with the interior of the volute ring 5 upon which laminations 6 are wound.

This spider is carried on a hub member 7 which in turn is connected to a nut 8 working on a worm 9 which constitutes a part of the supporting axle 1 so that as the unit 8 is rotated on the worm 9 the position of the arms of the spider is changed and the pressure upon the interior of the volute ring is increased or diminished, according to the direction of the movement of the nut.

The volute ring itself so supported consists of an annular member having a series of shoulders 10 which are the ends of volute portions which taper to affinity adjacent the next shoulder or retaining means or the retaining means are used to position the ends of the successive laminations which are wound one upon the other. These volute portions are designated 11. It is through them that the laminations are arranged in successive layers without adjacent joints one upon another in a spiral form. Spokes 12 are provided for positioning the arms with respect to the volute ring.

Carried on the axle 1 is a positioning member or plate 13. This end member 13 turns freely on the axle 1 and is prevented from rotation in one direction by the pawl 14 engaging with the ratchet 15 on the hub of the end member 13. This pawl is carried on a shaft 16 which is mounted on a support 17 which is stationary and serves to carry the axle 1. The axle 1 is mounted on a bearing 18 carried by this support 17. Near the periphery of the end member 13 is a chamber 19 in which is located a retaining finger 20. This retaining finger is adapted to engage with the surface of one of the laminations, preferably the initial lamination to hold it in position while the winding is being carried out. This positioning finger is positioned by the set screw 21 carried by the end member 13 which engages with the shoulder 22 on the positioning finger.

Another end member which is adapted to engage with the edges of the laminations in the same way 13 engages with the laminations on the other side is designated 23. This end member is threaded upon a worm 9 as at 24 so that it can be brought up in engagement with the edges of the laminations as at 25 to align them in cooperation with the end member 13. This rotating end member 13 is rotated through the agency of a handle 26.

The successive laminations are pressed into position after the glue or other means of fastening has been applied to the laminations by the roller 27 which is carried on an arm 28. This arm is pivoted on a shaft 29. A weight arm 30 is connected thereto upon which is mounted a weight 31 which may be varied in position to vary the leverage. This is accomplished by a supporting ring 32 being located in successive notches 33 on the weight arm 30.

If it is desired to lift this arm, a cable 35 is attached to the link 36 on the end of the weight arm 30.

The end of the first lamination is inserted beneath a corrugated plate 37 which tapers to a fine sharp blade at 38. The end of the lamination inserted between this corrugated surface and the volute ring surface has a covering of fabric designated 39 (Fig. 3) to protect it and prevent it from slipping.

The clamping finger 20 is clamped upon the lamination adjacent thereto clamping the lamination between it and the volute ring.

Before the ring is formed the laminated structure is removed from the volute ring which serves as a mandrel, a very thin metal clamping ring known as a drying ring is placed on the outside of the laminated structure with its ends overlapping. This drying ring is designated 40. One end of the drying ring has a plurality of U-shaped struck-up teeth 41 which serve to engage with the outermost lamination to prevent the ring from slipping thereon. A clamp 42 equipped with a clamping screw 43 and a clamping shoe 44 connected to the screw by a ball and socket joint 45 is used for clamping this ring on the completed structure after it has been removed from the volute ring which serves as a mandrel.

The volute ring 5 is provided with a series of retaining screws 46 having corrugated faces 47. These screws are used for engaging the under surface of the lamination to position it and to prevent it from being drawn out during the initial wrapping operation.

*Operation.*

The volute ring is mounted upon the spider and the spider is expanded through the agency of a nut 8 until there is a firm engagement and positioning of the ring on the spider.

At this time the rotating end member 23 has been removed so the ring can be mounted or backed off to permit of this arrangement. The laminations are successively mounted on the volute ring as follows. One lamination having the fabric covered end is inserted beneath a corrugated overlapping finger 37 and the screws having corrugated faces designated 46 are moved into engagement with the bottom of the lamination to force it against the corrugated surface 37. This firmly engages one end of the lamination which is wrapped around the ring. The next lamination is pressed in position with its end abutting against the portion marked 10 on the ring. This pressing is continued so that a number of laminations are wound on successive volutes giving something of a spiral winding to the laminations. The roller 27 under the influence of the weight 31 continually presses these laminations upon one another. It will be understood that the laminations are glued as they are placed upon one another.

It will also be understood that the positioning finger 20 is used to position the laminations as hereinbefore described. After starting the laminations the rotating end member is moved into position so that the laminations between the end members 23 will be properly positioned laterally.

The pawl prevents the backward movement of the end member 13.

It is thus possible to wind these successive laminations on the volute ring under pressure and properly aligned.

When the winding is completed the screws 46 are backed-off, and the positioning finger withdrawn.

The laminated structure is removed on its volute ring and when the ring is removed the drying ring with the clamp is placed thereon to hold the structure in position pending its drying.

Thereafter it is put in a lathe and turned to its desired form.

It will be understood that I do not desire to confine myself to the details of my invention, but comprehend within it suitable and necessary modifications.

Having thus fully described my invention, what I claim as new and desire to secure by Letters Patent, is:—

1. In a ring, a ring structure having a series of projecting portions laid out on successive volutes.

2. In a ring, a ring structure having a series of projecting portions laid out on successive volutes, the portions of the ring thus laid out having their ends of greatest thickness adjacent the next succeeding volute portion of minimum thickness.

3. In a ring for supporting laminations, an interior surface laid out on a circle, and an exterior surface laid out on successive volutes, the volute portions terminating on lines radiating from the center of the ring.

4. In a machine for forming laminated structures, a volute ring, and a collapsible spider supporting said ring.

5. In a machine for forming laminated structures, a volute ring, a collapsible spider supporting said ring, and means for moving the spider into and out of engagement with said volute ring.

6. In a machine for forming laminated structures, a volute ring, a collapsible spider supporting said ring, means for moving the spider into and out of engagement with said volute ring, and end members for aligning laterally laminations mounted on said ring and a positioning finger carried by one of said end members for maintaining the laminations in position.

7. In a machine for forming laminated structures, a volute ring, a collapsible spider supporting said ring, means for moving the spider into and out of engagement with said volute ring, end members for aligning laterally laminations mounted on said ring and a positioning finger carried by one of said end members for maintaining the laminations in position, and means of maintaining one end member from backward rotation.

8. In a machine for forming laminated structures, a volute ring, a collapsible spider supporting said ring, means for moving the spider into and out of engagement with said volute ring, end members for aligning laterally laminations mounted on said ring and a positioning finger carried by one of said end members for maintaining the laminations in position, means of maintaining one end member from backward rotation, and means for moving the other end member into and out of engagement with the laminations.

9. In a machine for forming laminated structures, a volute ring, a collapsible spider supporting said ring, means for moving the spider into and out of engagement with said volute ring, end members for aligning laterally laminations mounted on said ring and a positioning finger carried by one of said end members for maintaining the laminations in position, means of maintaining one end member from backward rotation, means for moving the other end member into and out of engagement with the laminations, and means for applying pressure to the exterior of said laminations as applied to the ring.

10. In a ring for supporting laminations, a ring body having a series of projecting portions laid out on successive volutes, an overlapping engaging finger adjacent the positioning end of one of the volutes for engaging between it and the ring a lamination.

11. In a ring for supporting laminations, a ring body having a series of projecting portions laid out on successive volutes, an overlapping engaging finger adjacent the positioning end of one of the volutes for engaging between it and the ring a lamination, and means carried by said ring for engaging with the inside of the initial lamination.

12. In a machine for forming laminated structures, a volute ring, a positioning and retaining finger thereon, engaging means carried thereby, and a detachable spider supporting said ring.

13. In a machine for forming laminated structures, a volute ring, a positioning and retaining finger thereon, engaging means carried thereby, a detachable spider supporting said ring, and means of engaging the superior surface of a lamination as as applied for holding it in position.

14. In a machine for forming laminated structures, a volute ring, a positioning and retaining finger thereon, engaging means carried thereby, a detachable spider supporting said ring, and means for applying pressure to the superior surface of the laminations as they are applied to one another.

15. In a machine for forming laminated structures, a volute ring, a positioning and retaining finger thereon, engaging means carried thereby, a detachable spider supporting said ring, means for applying pressure to the superior surface of the laminations as they are applied to one another, and means for engaging the edges of the laminations to align them laterally on the ring.

16. In a machine for winding laminations, a volute ring, a detachable supporting spider having spring arms mounted on an axle, a worm on said axle, means traveling on said worm for actuating said spider, an end member carried on said axle, a retaining finger carried thereby, a second end member mounted on said worm, a ratchet on the first end member, a pawl stationarily mounted adjacent thereto, a pressure roller adjacent said ring, and means of applying a weight to said pressure roller.

17. In a machine for winding laminations, a volute ring, a detachable supporting spider having spring arms mounted on an axle, a worm on said axle, means traveling on said worm for actuating said spider, an end member carried on said axle, a retaining finger carried thereby, a second end member mounted on said worm, a ratchet on the first end member, a pawl stationarily mounted adjacent thereto, a pressure roller adjacent said ring, means of applying a weight to said pressure roller, and means for engaging a lamination on said volute ring to prevent it slipping.

18. In a method of forming a laminated structure, mounting successive laminations on a volute ring, applying glue to such laminations, applying pressure to the laminations successively as they are wound on the ring, and arranging the end of the laminations initially applied to the ring against the ends of the volute portion of the ring.

19. In a method of forming a laminated structure, providing a volute ring having a series of volute portions the maximum depth of which is a depth of a lamination, said ring having a retaining finger, wrapping the end of the initial lamination with a textile medium, inserting said end between the ring and overlapping finger, placing the next lamination on the ring with its end abutting the next volute portion of the ring, placing successive laminations likewise against the successive volute portions, and placing successive laminations end to end whereby the joints will not be adjacent to one another.

20. In a method of forming a laminated structure, providing a volute ring having a series of volute portions the maximum depth of which is a depth of a lamination, said ring having a retaining finger, wrapping the end of the initial lamination with a textile medium, inserting said end between the ring and overlapping finger, placing the next lamination on the ring with its end abutting the next volute portion of the ring, placing successive laminations likewise against the successive volute portions, placing successive laminations end to end whereby the joints will not be adjacent to one another, and applying pressure to the laminations as they are applied to one another and placing a retaining substance such as glue between the laminations as they are applied to one another.

21. In a method of forming a laminated structure, providing a volute ring having a series of volute portions the maximum depth of which is a depth of a lamination, said ring having a retaining finger, wrapping the end of the initial lamination with a textile medium, inserting said end between the ring and overlapping finger, placing the next lamination on the ring with its end abutting the next volute portion of the ring, placing successive laminations likewise against the successive volute portions, placing successive laminations end to end whereby the joints will not be adjacent to one another, applying pressure to the laminations as they are applied to one another and placing a retaining substance such as glue between the laminations as they are applied to one another, and aligning said laminations laterally as they are applied to one another.

22. In a method of forming a laminated structure, providing a volute ring having a series of volute portions the maximum depth of which is a depth of a lamination, said ring having a retaining finger, wrapping the end of the initial lamination with a textile medium, inserting said end between the ring and overlapping finger, placing the next lamination on the ring with its end abutting the next volute portion of the ring, placing successive laminations likewise against the successive volute portions, placing successive laminations end to end whereby the joints will not be adjacent to one another, applying pressure to the laminations as they are applied to one another and placing a retaining substance such as glue between the laminations as they are applied to one another, aligning said laminations laterally as they are applied to one another, removing said volute ring, applying a drying ring and allowing the laminations to dry.

23. In combination in a drying ring of a band and struck-up teeth on the interior surface of one end of the band.

24. In combination in a drying apparatus for laminated structures, a drying ring having engaging members on one end thereof, and a clamp adapted to engage with the laminated structure and the drying ring.

25. In combination in a drying apparatus for laminated structures, a drying ring having engaging members on one end thereof, a clamp adapted to engage with the laminated structure and the drying ring, and means of applying pressure to said clamp consisting of a shoe, a worm, and a universal joint therebetween, and a supporting member for engaging the drying ring and laminated structure between it and the shoe.

In testimony whereof I affix my sinature.
FRANK V. TISCHER.